(12) United States Patent
Murayama (10) Patent No.: US 9,802,503 B2
(45) Date of Patent: Oct. 31, 2017

(54) POWER MANAGEMENT DEVICE

(71) Applicant: Panasonic Corporation, Osaka (JP)

(72) Inventor: Kei Murayama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 765 days.

(21) Appl. No.: 14/356,651

(22) PCT Filed: Nov. 8, 2012

(86) PCT No.: PCT/JP2012/007167
§ 371 (c)(1),
(2) Date: May 7, 2014

(87) PCT Pub. No.: WO2013/069283
PCT Pub. Date: May 16, 2013

(65) Prior Publication Data
US 2014/0285001 A1    Sep. 25, 2014

(30) Foreign Application Priority Data

Nov. 8, 2011    (JP) .................................. 2011-244632

(51) Int. Cl.
*B60L 1/00*    (2006.01)
*B60L 11/18*    (2006.01)
(Continued)

(52) U.S. Cl.
CPC ......... *B60L 11/1842* (2013.01); *B60L 3/0046* (2013.01); *B60L 11/184* (2013.01);
(Continued)

(58) Field of Classification Search
CPC ....... B60L 11/1842; B60L 3/0046; H02J 3/32; Y02T 10/7005
(Continued)

(56) References Cited

U.S. PATENT DOCUMENTS 6,932,174 B2 *  8/2005  Hirata ................. B60L 11/1851
                                              180/65.245
7,042,176 B2    5/2006  Wobben
(Continued)

FOREIGN PATENT DOCUMENTS

DE    20 2008 015 537 U1    11/2008
DE    10 2010 040 348 A1    3/2011
(Continued)

OTHER PUBLICATIONS

Extended European Search Report dated Feb. 24, 2016 for corresponding European Application No. 12848454.0.
(Continued)

*Primary Examiner* — Jared Fureman
*Assistant Examiner* — Alfonso Perez Borroto
(74) *Attorney, Agent, or Firm* — Renner, Otto, Boisselle & Sklar, LLP (57) ABSTRACT

In order to manage power exchanged between an electric vehicle 1 and a house system 2 including an electric device 22, a power management device includes a vehicle detection portion 26 configured to detect a vehicle available for a resident of the house. A controller 24 determines power supplied from the electric vehicle 1 to the house system 2 in accordance with the presence of the vehicle detected by the vehicle detection portion 26. The power management device can thereby supply power from an electric vehicle to a house while securing the situation where the resident can move by vehicle in emergencies.

6 Claims, 8 Drawing Sheets

(51) Int. Cl.
*H02J 3/32* (2006.01)
*B60L 3/00* (2006.01)
*H02J 7/34* (2006.01)

(52) U.S. Cl.
CPC ....... *B60L 11/1816* (2013.01); *B60L 11/1824* (2013.01); *B60L 11/1825* (2013.01); *B60L 11/1844* (2013.01); *B60L 11/1846* (2013.01); *B60L 11/1848* (2013.01); *B60L 11/1861* (2013.01); *B60L 11/1862* (2013.01); *H02J 3/32* (2013.01); *B60L 2200/12* (2013.01); *B60L 2210/10* (2013.01); *B60L 2210/30* (2013.01); *B60L 2230/22* (2013.01); *B60L 2230/28* (2013.01); *B60L 2240/54* (2013.01); *B60L 2240/547* (2013.01); *B60L 2240/549* (2013.01); *B60L 2240/622* (2013.01); *B60L 2240/80* (2013.01); *B60L 2250/12* (2013.01); *B60L 2260/52* (2013.01); *B60L 2260/54* (2013.01); *H02J 7/34* (2013.01); *Y02E 60/721* (2013.01); *Y02T 10/7005* (2013.01); *Y02T 10/705* (2013.01); *Y02T 10/7044* (2013.01); *Y02T 10/7088* (2013.01); *Y02T 10/7216* (2013.01); *Y02T 10/7241* (2013.01); *Y02T 10/7291* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/169* (2013.01); *Y04S 10/126* (2013.01); *Y04S 30/14* (2013.01)

(58) Field of Classification Search
USPC .......................................................... 307/9.1
See application file for complete search history.

(56) References Cited

U.S. PATENT DOCUMENTS

| | | |
|---|---|---|
| 2009/0192655 A1 | 7/2009 | Ichikawa et al. |
| 2010/0076825 A1 | 3/2010 | Sato et al. |
| 2011/0057613 A1 | 3/2011 | Taguchi et al. |
| 2011/0140659 A1* | 6/2011 | Suzuki ................ B60L 11/1824 320/109 |
| 2011/0204720 A1 | 8/2011 | Ruiz et al. |
| 2011/0260691 A1 | 10/2011 | Ishibashi et al. |
| 2011/0309674 A1* | 12/2011 | Kamachi ................ B60L 1/006 307/10.1 |
| 2012/0016546 A1* | 1/2012 | Nilssen .................. H02J 9/062 701/22 |

FOREIGN PATENT DOCUMENTS

| | | |
|---|---|---|
| DE | 10 2010 011 704 U1 | 9/2011 |
| EP | 2 045 884 A1 | 4/2009 |
| EP | 2 048 762 A1 | 4/2009 |
| JP | 2001-008380 | 1/2001 |
| JP | 2001-008380 A | 1/2001 |
| JP | 2002-315193 A | 10/2002 |
| JP | 2006-216331 A | 8/2006 |
| JP | 2008-054439 A | 3/2008 |
| JP | 2009-005450 | 1/2009 |
| JP | 2009-278776 A | 11/2009 |
| JP | 2010-541182 A | 12/2010 |
| WO | WO 2010/057948 A2 | 5/2010 |

OTHER PUBLICATIONS

International Search Report for corresponding International Application No. PCT/JP2012/007167 dated Feb. 5, 2013.
Form PCT/ISA/237 for corresponding International Application No. PCT/JP2012/007167 dated Feb. 5, 2013.

* cited by examiner

POWER MANAGEMENT DEVICE

TECHNICAL FIELD

The present invention relates to a power management device which manages electric power exchanged between a house and an electric vehicle.

BACKGROUND ART

One of the known techniques to supply electric power from an electric vehicle to a house is a power management system as shown in Patent Literature 1 described below. This power management system learns the battery consumption during ordinary travel of the electric vehicle and determines the minimum amount of power to be secured in the electric vehicle based on the learning results. The power management device charges the electric vehicle during late-night hours and supplies electric power from the electric vehicle to the house during other than the late-night hours while leaving the minimum amount of power to be secured.

In the aforementioned power management system, the electric vehicle, which still has the minimum amount of power to be secured, cannot travel with the secured amount of power in emergencies where unexpected travel of the electric vehicle is required. If the charge level is always maintained constant in the light of emergencies in preparation, the electric vehicle cannot supply so much electric power to the house.

Accordingly, the present invention is proposed in the light of the aforementioned circumferences, and an object thereof is to provide a power management device which can supply power from an electric vehicle to a house while securing the situation where the user can move by vehicle in emergencies.

CITATION LIST

Patent Literature

Patent Literature 1: Japanese Patent Laid-open Publication No. 2001-8380

SUMMARY OF INVENTION

A power management device according to a first aspect to solve the aforementioned problem is a power management device, which manages power exchanged between an electric vehicle and a house including an electric device, the power management device including: a vehicle detection portion configured to detect a vehicle which is available for a resident of the house; and a power controller configured to determine power supplied from the electric vehicle to the house in accordance with the presence of the vehicle detected by the vehicle detection portion. The power controller changes a lower limit of a charge level of the electric vehicle in accordance with the presence of the vehicle detected by the vehicle detection portion and discharges power from the electric vehicle to the house until the charge level reaches the lower limit.

A second aspect thereof is the power management device according to the first aspect in which the vehicle detection portion detects the presence of a vehicle with a sensor device.

A third aspect thereof is the power management device according to the first aspect in which the vehicle detection portion detects the presence of a vehicle by communication with the vehicle.

A fourth aspect thereof is the power management device according to the first aspect in which the vehicle detection portion detects the presence of a vehicle through an operation portion operated by a user.

A fifth aspect thereof is the power management device according to the first aspect in which when the vehicle is an electric vehicle, the vehicle detection portion detects the presence of a vehicle based on communication connection for charging and discharging which is performed by the electric vehicle.

A sixth aspect thereof is the power management device according to any one of the first to fifth aspects in which the power controller calculates a cruising distance of the vehicle detected by the vehicle detection portion and determines power to be supplied from the electric vehicle to the house based on the calculated cruising distance.

DESCRIPTION OF EMBODIMENTS

Hereinafter, a description is given of embodiments of the present invention with reference to the drawings.

Figure 1:
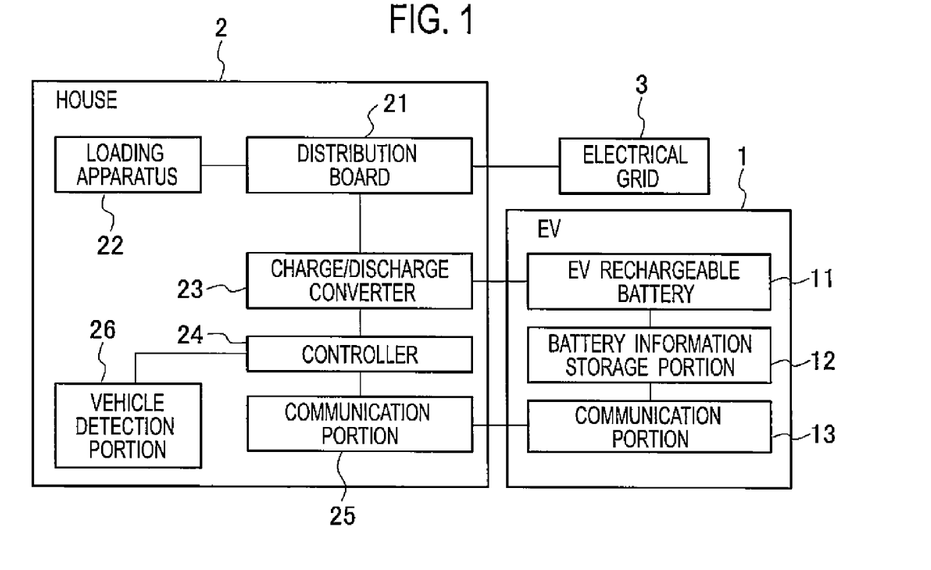
FIG. 1 is a block diagram illustrating a configuration of a power supply system as an embodiment of the present invention.

A power supply system shown as an embodiment of the present invention is configured as illustrated in FIG. 1, for example. The power supply system includes an electric vehicle (EV) 1 and a house system 2. The house system 2 is connected to an electrical grid 3. In the power supply system, the electric vehicle 1 can be electrically connected to the house system 2 via a power cable.

In the power supply system, the house system 2 is supplied with power (hereinafter, referred to as grid power) from the electrical grid 3, and the grid power is supplied to a loading apparatus (an electric apparatus) 22 such as home appliances in the house. Moreover, in the power supply system, the grid power supplied from the electrical grid 3 to the house system 2 can be supplied to the electric vehicle 1. Furthermore, in the power supply system, the electric power stored in the electric vehicle 1 can be supplied to the loading apparatus 22 of the house system 2.

The electric vehicle 1 includes an EV rechargeable battery 11, a battery information storage portion 12, and a communication portion 13.

The EV rechargeable battery 11 is a rechargeable battery installed in the electric vehicle 1. The EV rechargeable battery 11 stores electric power so that the electric vehicle 1 can travel. This power is supplied from the house system 2, accumulated in the EV rechargeable battery 11, and then consumed as the electric vehicle 1 travels. Moreover, the electric vehicle 1 can be charged at an EV charging station and the like in addition to the house system 2.

The battery information storage portion 12 stores the charge level (SOC: state of charge, for example) as battery information of the EV rechargeable battery 11. The battery information storage portion 12 updates the charge level as the EV rechargeable battery 11 is charged or discharged.

The communication portion 13 sends and receives communication signals to and from the communication portion 25 of the house system 2. The communication portion 13 sends to the communication portion 25 of the house system 2, the battery information stored in the battery information storage portion 12. The communication portion 25 may communicate via a communication cable incorporated in the power cable that connects the electric vehicle 1 and house system 2 or may communicate by radio.

The house system 2 includes a distribution board 21, the loading apparatus 22, a charge/discharge converter 23, a controller 24, the communication portion 25, and a vehicle detection portion 26.

The charge/discharge converter 23 is electrically connected to the electric vehicle 1 through the power cable. When being connected to the electric vehicle 1, the charge/discharge converter 23 exchanges electric power with the electric vehicle 1 in accordance with the control of the controller 24. The charge/discharge converter 23 includes a DC/DC converter and an AC/DC converter. The charge/discharge converter 23 performs AC/DC conversion between the voltage suitable for the house system 2 and the voltage suitable for the EV rechargeable battery 11 of the electric vehicle 1. The voltage suitable for the house system 2 is an alternating-current voltage of 100 V, for example. The voltage suitable for the EV rechargeable batter 11 of the electric vehicle 1 is a direct-current voltage of 300 to 400 V, for example.

The distribution board 21 is connected to the loading apparatus 22, electrical grid 3, and charge/discharge converter 23. The distribution board 21 includes branch circuits, relays, breakers, and the like. The distribution board 21 distributes the grid power supplied from the electrical grid 3 to the loading apparatus 22. The distribution board 21 supplies electric power to the charge/discharge converter 23 in the process of charging the EV rechargeable battery 11 of the electric vehicle 1. Furthermore, when being supplied with power discharged from the EV rechargeable battery 11 of the electric vehicle 1 through the charge/discharge converter 23, the distribution board 21 distributes the power discharged from the EV rechargeable battery 11 to the loading apparatus 22 and the like.

The distribution board 21 may be connected to a solar cell or a fuel cell. The distribution board 21 can distribute electric power generated by the connected solar or fuel cells, to the loading apparatus 22 and the charge/discharge converter 23.

The loading apparatus 22 includes various types of home appliances in the house system 2.

The controller 24 functions as a power controller of a power management device which manages the power exchanged between the electric vehicle 1 and the house system 2 including the loading apparatus 22. The controller 24 is connected to the vehicle detection portion 26 and the communication portion 25.

The vehicle detection portion 26 functions as a vehicle detection portion of the power management device that senses a vehicle available for the resident of the house (the user). The vehicle detection portion 26 detects a vehicle that is available for the resident of the house other than the vehicle 1, in particular. In the following description, the vehicle detected by the vehicle detection portion 26 other than the electric vehicle 1 as an object of control is called a second vehicle. In other words, the vehicle detection portion 26 is capable of detecting a second vehicle as well as the electric vehicle 1 electrically connected to the house system 2. The second vehicle only needs to be a moving means which can be substituted for the electric vehicle 1, and the vehicle detection portion 26 may be configured to detect the electric vehicle 1 not connected to the house system 2 as a second vehicle. The second vehicle as an object to be detected by the vehicle detection portion 26 may includes gasoline vehicles, gas vehicles, and motorcycles, which are not electric vehicles, for example, and may also include a resident's vehicle which is not located in the site of the house. The specific configuration of the vehicle detection portion 26 is described later.

The controller 24 functions as a power controller which determines power to be supplied from the electric vehicle 1 to the house system 2 in accordance with the presence of the second vehicle detected by the vehicle detection portion 26. The controller 24 performs control to supply electric power from the electric vehicle 1 to the house system 2 while securing the situation where the resident (user) can move by vehicle in emergencies. In other words, the controller 24 is configured to supply more power from the electric vehicle 1 to the house system 2 when the second vehicle is detected by the vehicle detection portion 26 than when the second vehicle is not detected. On the other hand, the controller 24 is configured to supply less power from the electric vehicle 1 to the house system 2 when the second vehicle is not detected by the vehicle detection portion 26 than when the second vehicle is detected. The specific operation thereof is described later.

As described above, the power supply system determines the electric power supplied from the electric vehicle 1 to the house system 2 in accordance with the presence of the second vehicle detected by the vehicle detection portion 26. The power supply system therefore can supply electric power from the electric vehicle 1 to the house system 2 with the travel means in emergencies secured.

Next, a description is given of the specific operation of the aforementioned power supply system.

Figure 2:
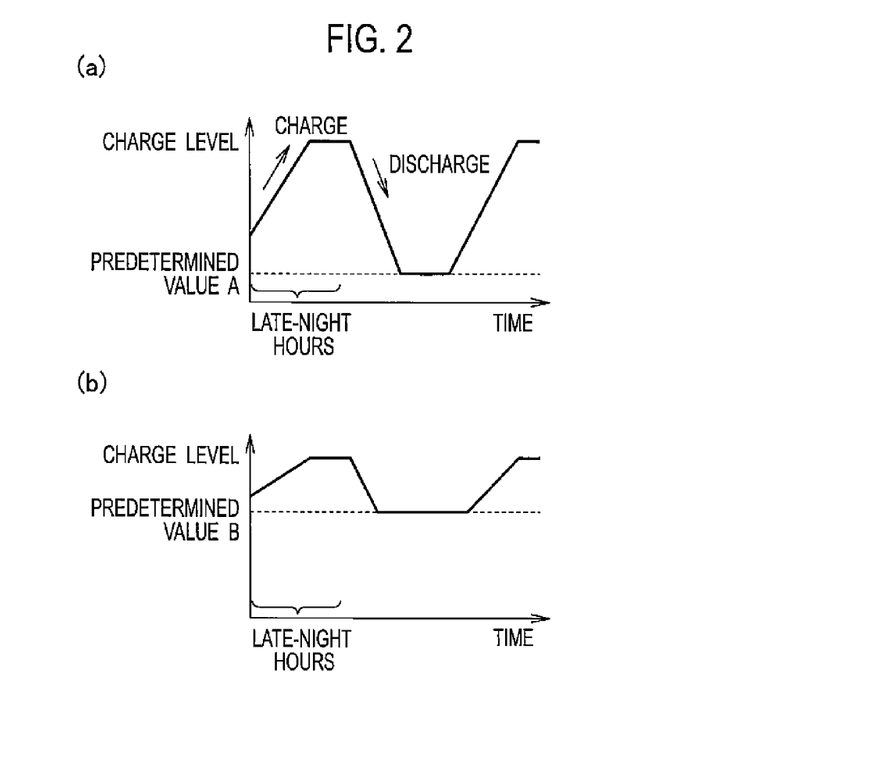
FIGS. 2(a) and 2(b) are diagrams showing changes in charge level in the power supply system as the embodiment of the present invention, FIG. 2(a) showing the case where there is a second vehicle, FIG. 2(b) showing the case where there is no second vehicle.

The power supply system changes the lower limit of the charge level of the EV rechargeable battery 11 in accordance with the presence of the second vehicle and causes the electric vehicle 1 to discharge electric power to the house system 2 until the charge level reaches the lower limit. To be specific, in the presence of the second vehicle, the lower limit of the charge level of the EV rechargeable battery 11 is set to a low value as shown in FIG. 2(*a*). On the other hand, in the absence of the second vehicle, the lower limit of the charge level of the EV rechargeable battery 11 is set to a high value as shown in FIG. 2(*b*). Hereinafter, a description is given of the control of charge and discharge of the EV rechargeable battery 11 with reference to FIG. 3.

Figure 3:
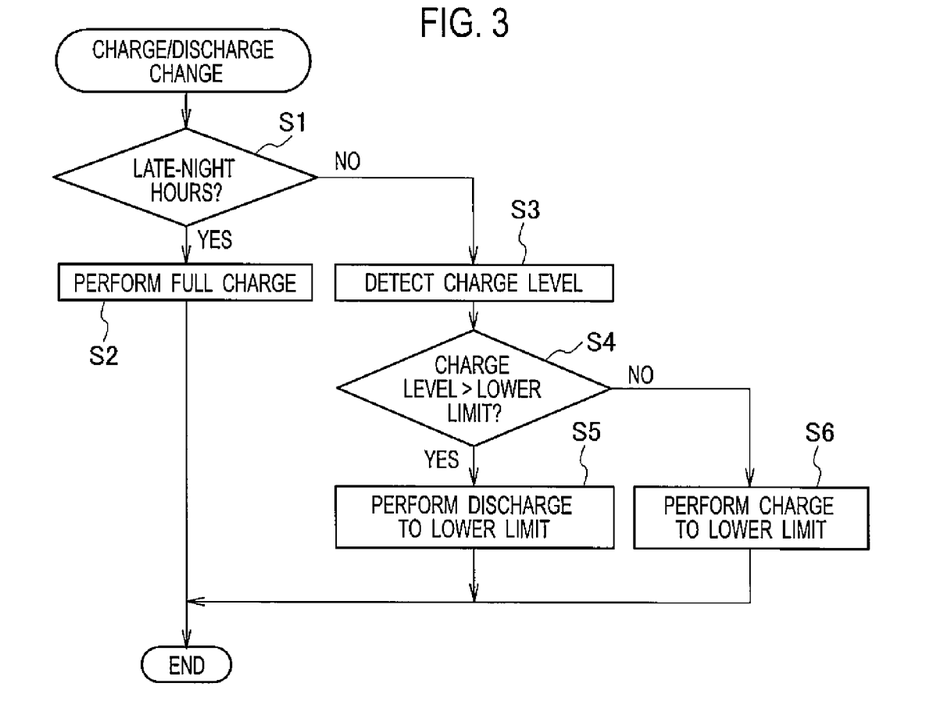
FIG. 3 is a flowchart showing charge/discharge control for an EV rechargeable battery in the power supply system as the embodiment of the present invention.

The power supply system performs the operation shown in FIG. 3 to supply electric power from the electric vehicle 1 to the house system 2. Step 1 is conducted every predetermined time period previously set.

First in the step S1, the controller 24 refers to a not-shown timer and determines whether the present time is in nighttime hours. The nighttime hours are previously set by a user or the like. When the present time is in the nighttime hours, the controller 24 proceeds to step S2 or otherwise proceeds to step S3.

In the step S2, the controller 24 performs charge of the EV rechargeable battery 11 so that the EV rechargeable battery 11 is fully charged (see FIGS. 2(*a*) and 2(*b*)). In this process, the controller 24 supplies DC voltage having a predetermined DC voltage value from the charge/discharge converter 23 to the electric vehicle 1. In the electric vehicle 1, the EV rechargeable battery 11 is charged in response to the supply of the DC voltage.

In the step S3, the communication portion 13 of the electric vehicle 1 detects the charge level of the EV rechargeable battery 11 and sends the detected charge level to the communication portion 25 of the house system 2. The controller 24 detects the charge level of the EV rechargeable battery 11 through communication between the communication portions 13 and 25.

In next step S4, the controller 24 determines whether the charge level detected in the step S3 is higher than the predetermined lower limit. When the charge level detected in the step S3 is higher than the predetermined lower limit, the controller 24 proceeds to step S5 or otherwise proceeds to step S6. The predetermined lower limit is described with reference to FIG. 4 below.

In the step S5, the controller 24 conducts discharge of the EV rechargeable battery 11 to the previously set lower limit. In this process, the controller 24 controls the charge/discharge converter 23 to extract power from the EV rechargeable battery 11. The charge/discharge converter 23 then converts the electric power discharged from the EV rechargeable battery 11 to certain AC power so that the discharged power can be supplied to the loading apparatus 22 via the distribution board 22.

In the step S6, the controller 24 allows the EV rechargeable battery 11 to be charged to the previously set lower limit. In this process, the controller 24 controls the charge/discharge converter 23 and causes the same to supply DC voltage to the EV rechargeable battery 11. In accordance with the control by the controller 24, the charge/discharge converter 23 extracts the grid power from the distribution board 21, converts the same to a predetermined DC voltage, and supplies the same to the EV rechargeable battery 11.

Figure 4:
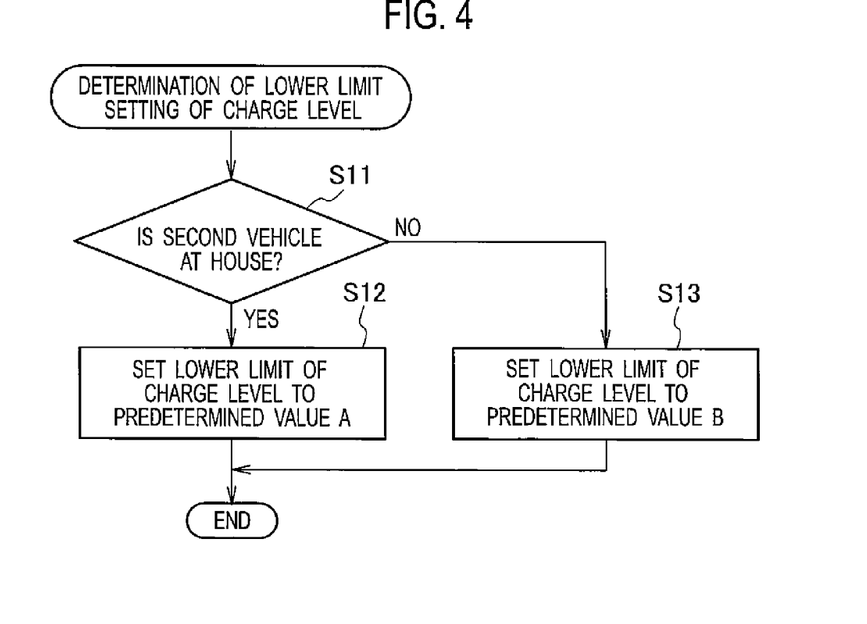
FIG. 4 is a flowchart showing a process of determining the lower limit of the charge level of the EV rechargeable battery in the power supply system as the embodiment of the present invention.

FIG. 4 shows the process of determining the predetermined lower limit. In the process of determining the predetermined lower limit, step S11 is conducted every predetermined period previously set.

First in step S11, the controller 24 determines based on the results of detection by the vehicle detection portion 26 whether the second vehicle other than the electric vehicle 1 is located at the house. When the second vehicle other than the electric vehicle 1 is located at the house, the controller 24 proceeds to step S12 or otherwise proceeds to step S13.

In the step S12, the controller 24 sets the lower limit of the charge level of the EV rechargeable battery 11 to a predetermined value A (a low level). In the step S13, the controller 24 sets the lower limit of the charge level of the EV rechargeable battery 11 to a predetermined value B (a high level) (see FIG. 2(*b*)).

When the lower limit of the charge level of the EV rechargeable battery 11 is set to the predetermined value A as shown in FIG. 2(*a*), the aforementioned lower limit in the step S4 of FIG. 3 is equal to the predetermined value A of the low level. Accordingly, in the step S5, the power supply system allows the EV rechargeable battery 11 to be discharged until the charge level of the EV rechargeable battery 11 reaches the low level as the predetermined value A. On the other hand, in the step S6, the power supply system only needs to charge the EV rechargeable battery 11 until the charge level of the EV rechargeable battery 11 reaches the low level as the predetermined value A.

When the lower limit of the charge level of the EV rechargeable battery 11 is set to the predetermined value B as shown in FIG. 2(*b*), the aforementioned lower limit in the step S4 of FIG. 3 is equal to the predetermined value B of the high level. Accordingly, in the step S5, the power supply system can only discharge the EV rechargeable battery 11 until the charge level of the EV rechargeable battery 11 becomes a high level, such as the predetermined value B. On the other hand, in the step S6, the power supply system needs to charge the EV rechargeable battery 11 until the charge level of the EV rechargeable battery 11 reaches a high level, such as the predetermined value B.

The aforementioned power supply system can supply electric power from the electric vehicle 1 to the house system 2 with the travel means in emergencies secured. In other words, in the absence of the second vehicle other than the electric vehicle 1, the EV rechargeable battery 11 is ensured to have a high charge level. On the other hand, in the presence of the second vehicle, the electric power supplied from the EV rechargeable battery 11 to the house system 2 can be increased. The house system 2 can use the electric power of the EV rechargeable battery 11 without using the grid power of the electrical grid 3 during other than the time for charging the EV rechargeable battery 11 (nighttime hours), thus reducing the power cost of the house system 2. Moreover, it is possible to enhance the effect on shifting the peak of power consumption of the house system 2.

In the aforementioned power supply system, the charge level of the EV rechargeable battery 11 is controlled by the controller 24 of the house system 2 controlling the operation of the charge/discharge converter 23. However, the controller 24 as a controller may be provided for other than the house system 2. For example, the function of the controller 24 may be installed in the electric vehicle 1.

Moreover, in the aforementioned power supply system, the EV rechargeable battery 11 is charged during the nighttime hours and is discharged during other than the nighttime hours. When the power supply system is provided with a power generator such as a solar cell or a fuel cell, the EV rechargeable battery 11 may be configured to be charged with surplus power generated by the power generator and be discharged when the generated power is insufficient.

Next, a description is given of another configuration of the aforementioned power supply system.

Figure 5:
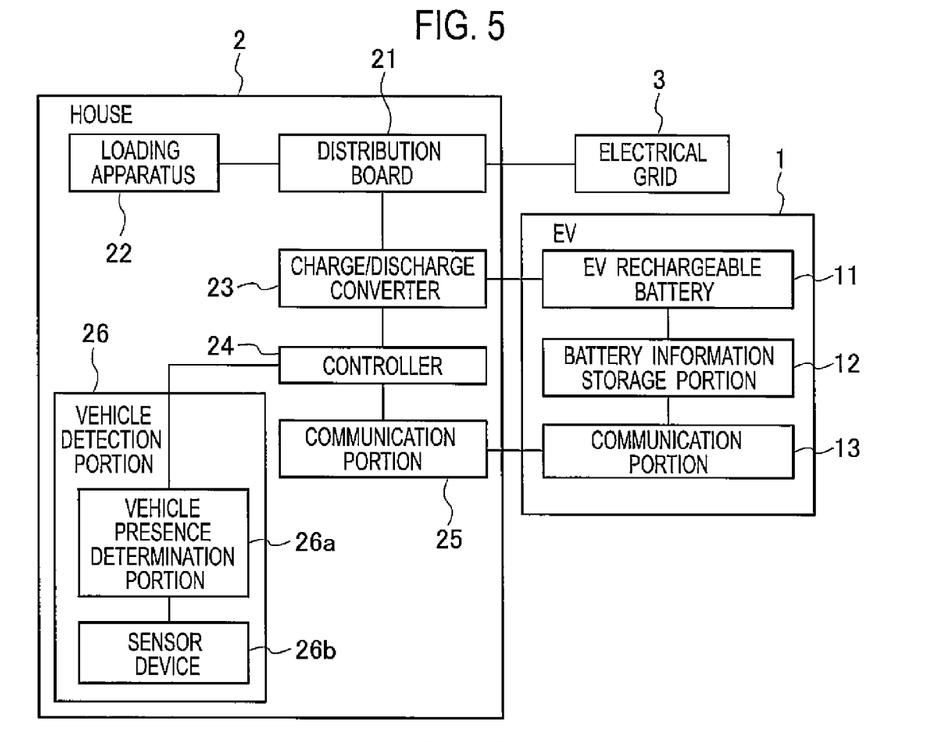
FIG. 5 is a block diagram illustrating another configuration of the power supply system as the embodiment of the present invention.

In the power supply system, the vehicle detection portion 26 may detect the presence of the second vehicle by using a sensor device 26b as shown in FIG. 5. The vehicle detection portion 26 includes the sensor device 26b and the vehicle presence determination portion 26a connected to the sensor device 26b.

The sensor device 26b is an infrared sensor, a motion detector, or the like which is provided for a parking space or a garage at the house, for example. The vehicle presence determination portion 26a detects the presence of the second vehicle other than the electric vehicle 1 which is available for the resident based on the detection output of the sensor device 26b. The power supply system can therefore detect the presence of the second vehicle other than the electric vehicle 1 by using the controller 24.

Figure 6:
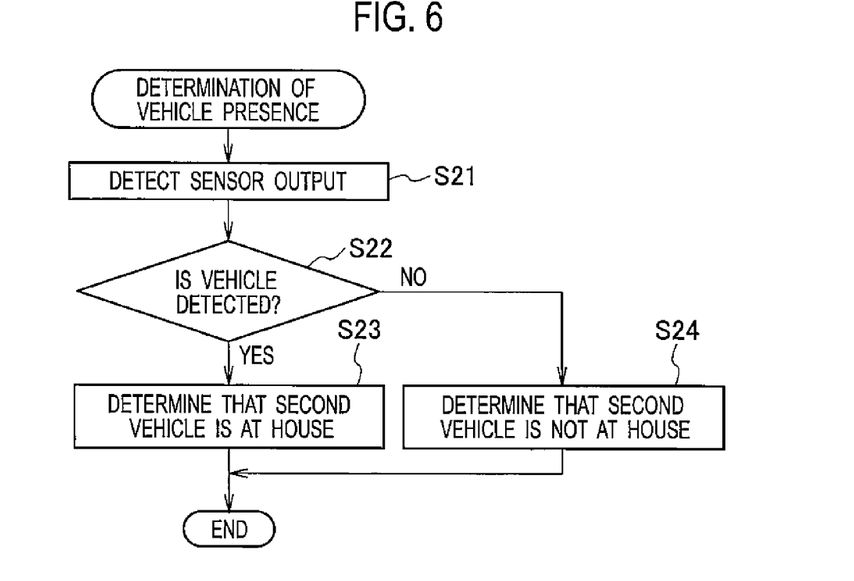
FIG. 6 is a flowchart showing a process of determining the presence of the second vehicle in the power supply system as the embodiment of the present invention.

The process of determining the presence of the second vehicle in this power supply system is performed as shown in FIG. 6. First in step S21, the vehicle presence determination portion 26a detects the sensor output of the sensor device 26b.

In next step S22, the vehicle presence determination portion 26a determines whether the second vehicle other than the electric vehicle 1 is detected. When the second vehicle other than the electric vehicle 1 is detected, the process goes to step S23, and it is determined that there is the second vehicle other than the electric vehicle 1. Otherwise, it is determined in step S24 that there is no second vehicle other than the electric vehicle 1.

Accordingly, the power supply system determines the presence of the second vehicle other than the electric vehicle 1 by using the vehicle presence determination unit 26a and, based on the determination result, controls the electric power supplied from the EV rechargeable battery 11 to the house system 2 by using the controller 24.

Figure 7:
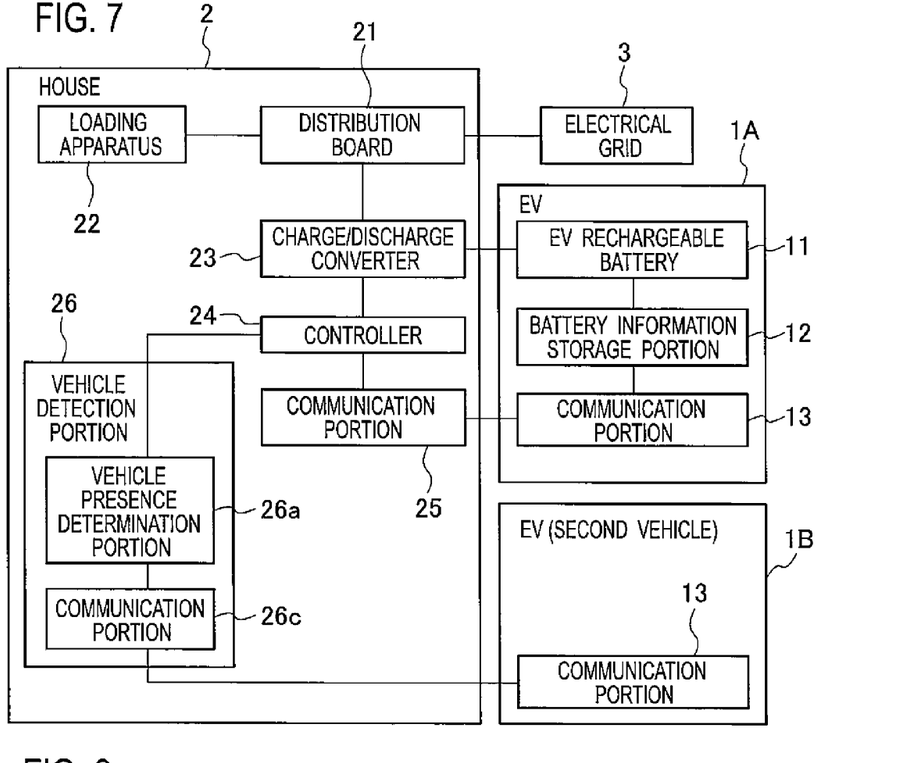
FIG. 7 is a block diagram showing still another configuration of the power supply system as the embodiment of the present invention.

In the aforementioned power supply system, the vehicle detection portion 26 may detect the presence of the second vehicle by using a communication portion 26c as illustrated in FIG. 7. The vehicle detection portion 26 includes the communication portion 26c and the vehicle presence determination portion 26a connected to the communication portion 26c.

The communication portion 26c is capable of communicating with a communication portion 13 of a second vehicle 1B, which is different from an electric vehicle 1A. The communication portion 26c may be configured to use Bluetooth (registered trademark), wireless LAN, ZigBee, RF tag, infrared communication, NFC, and the like as a means for implementing the communication function. The communication portion 26c communicates with the communication portion 13 of the second vehicle 1B to supply the communication results to the vehicle presence determination portion 26a.

The vehicle presence determination portion 26a determines the presence of the second vehicle other than the electric vehicle 1 based on the communication results of the communication portion 26c. For example, IDs of the electric vehicle 1A and the second vehicle 1B are registered in advance as the vehicles available for the resident. The communication portion 26c acquires the ID of the second vehicle 1B which can communicate with the communication portion 26c and supplies the acquired ID to the vehicle presence determination portion 26a as the communication results. When being supplied with the ID of the second vehicle 1B as the communication results of the communication portion 26c, the vehicle presence determination portion 26a can determine that there is the second vehicle other than the electric vehicle 1.

Figure 8:
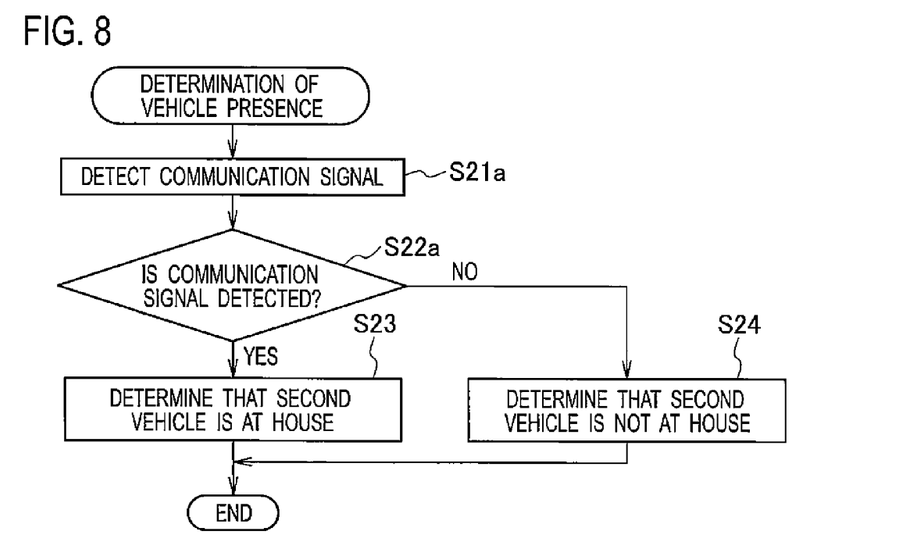
FIG. 8 is a flowchart showing another process of determining the presence of another vehicle in the power supply system as the embodiment of the present invention.

The process of determining the presence of the second vehicle in this power supply system is performed as shown in FIG. 8. First in step S21a, the communication portion 26c detects a communication signal between the communication portion 26c and the communication portion 13 of the second vehicle 1B.

In next step S22a, the vehicle presence determination portion 26a determines whether there is a communication signal exchanged with the second vehicle 1B as the communication results of the communication portion 26c. When there is a communication signal exchanged with the second vehicle 1B, the process goes to step S23, and it is determined that there is the second vehicle other than the electric vehicle 1. Otherwise, in the step S24, it is determined that there is no second vehicle other than the electric vehicle 1.

The aforementioned power supply system can determine the presence of the second vehicle other than the electric vehicle 1 by using the vehicle detection portion 26 and can control the electric power supplied from the EV rechargeable battery 11 to the house system 2 based on the determination results by using the controller 24.

Figure 9:
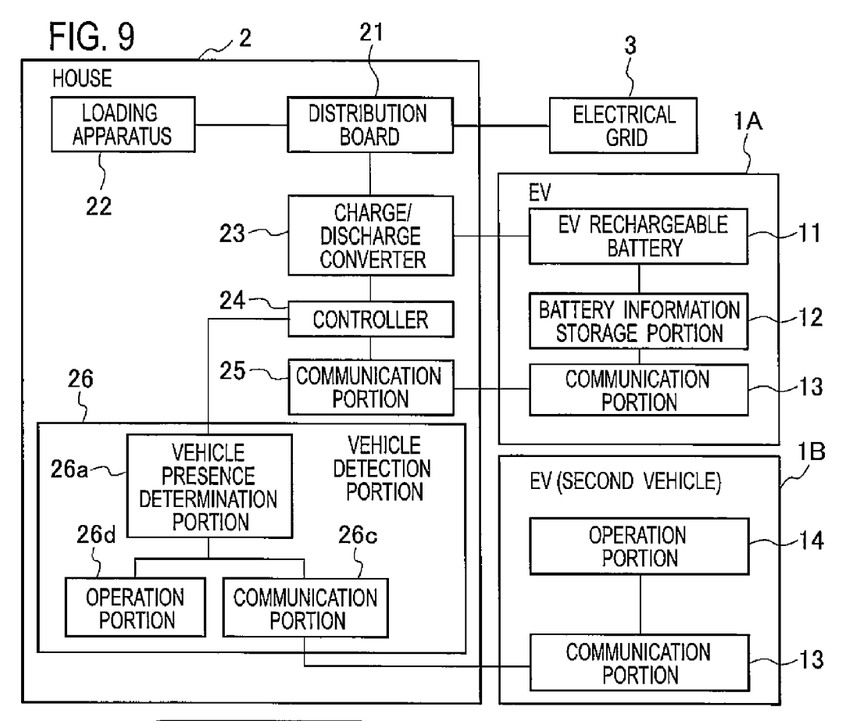
FIG. 9 is a block diagram showing still another configuration of the power supply system as the embodiment of the present invention.

In the aforementioned power supply system, the presence of the second vehicle may be detected in accordance with the resident's operation. As illustrated in FIG. 9, this power supply system includes an operation portion 26d of the vehicle detection portion 26 and an operation portion 14 of the second vehicle 1B as the configuration that can be operated by the resident. The operation portion of this power supply system only needs to be detected by the controller 24 and may be any one of the operation portions 26d and 14.

The operation portion 26d is composed of a liquid crystal touch panel which can be operated by the house's resident, for example. When receiving a resident's operation input indicating the presence of the second vehicle 1B, the operation portion 26d outputs an input signal indicating the presence to the vehicle presence determination portion 26a.

The operation portion 14 is operated by a driver of the second vehicle 1B or the like. The operation portion 14 is operated when the second vehicle 1B is parked by the driver or the like in a garage of the house or the like. When receiving an operation signal indicating that the another vehicle 1B is present in the garage or the like, the operation portion 14 sends an input signal indicating the presence through the communication portion 13 to the communication portion 26c. The vehicle detection portion 26c can therefore output the input signal to the vehicle presence determination portion 26a.

Upon receiving the input signal as the operation result from the operation portion 26d or communication portion 26c, the vehicle presence determination portion 26a determines that there is the second vehicle 1B.

Figure 10:
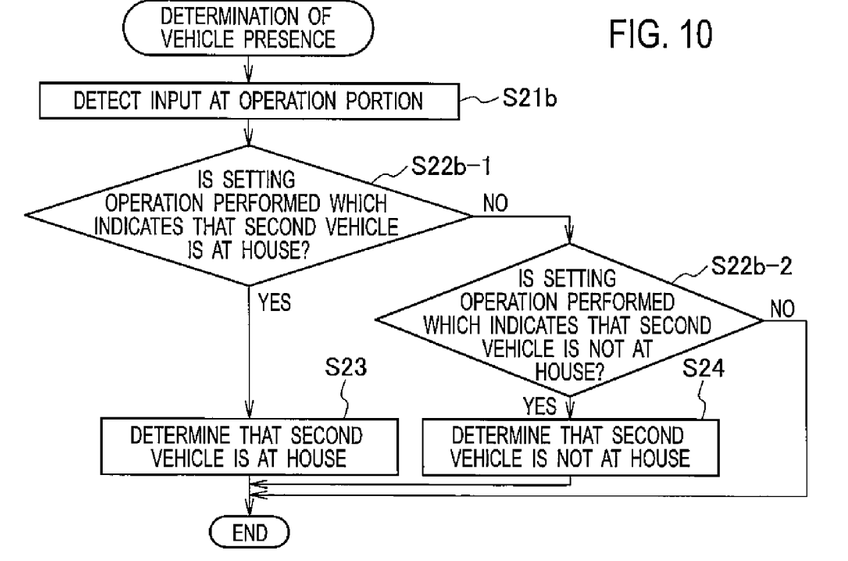
FIG. 10 is a flowchart showing still another process of determining the presence of a second vehicle in the power supply system as the embodiment of the present invention.

In this power supply system, the process of determining the presence of the second vehicle 1B is performed as shown in FIG. 10. First in step S21b, the operation portion 26d or operation portion 14 detects an operation input by the resident or the like. The detection result is supplied to the vehicle presence determination portion 26a.

Next, the vehicle presence determination portion 26a determines whether a setting operation indicating the presence of the second vehicle 1B at the house is performed by a resident's operation (step S22b-1) and whether a setting operation indicating the absence of the second vehicle 1B at the house is performed (step S22b-2). When the setting operation indicating the presence of the second vehicle 1B at the house is performed, the vehicle presence determination portion 26a determines in the step S23 that the second vehicle 1B is at the house. When the setting operation indicating the absence of the second vehicle 1B is performed, the vehicle presence determination portion 26a determines in the step S24 that the second vehicle 1B is not at the house.

The power supply system determines the presence of the second vehicle 1B other than the electric vehicle 1A by using the vehicle presence determination portion 26a and controls the electric power supplied from the EV rechargeable battery 11 to the house system 2 based on the determination result by using the controller 24.

Figure 11:
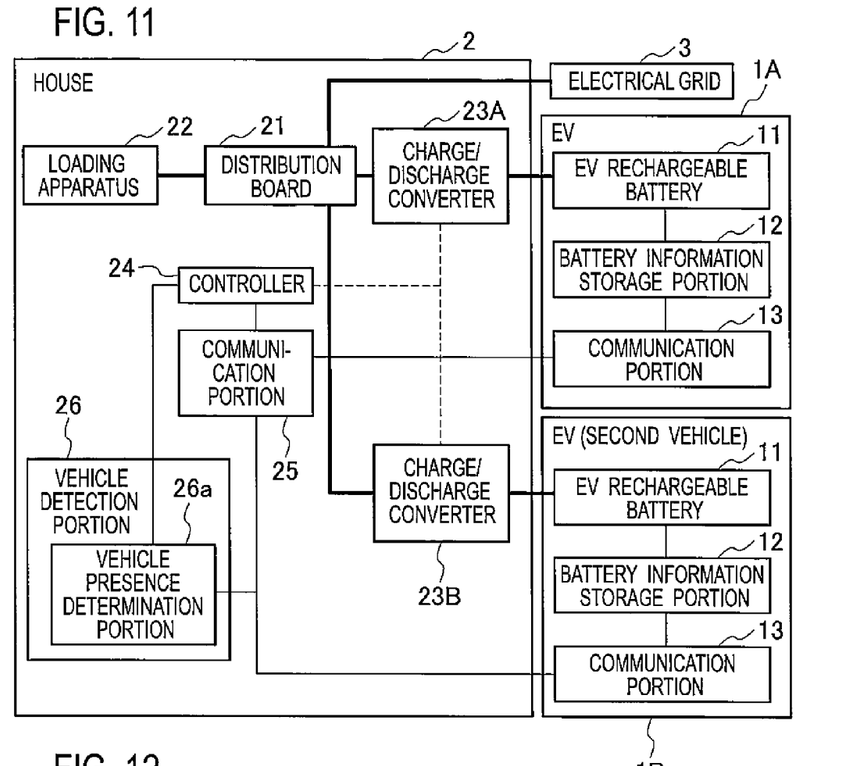
FIG. 11 is a block diagram showing still another configuration of the power supply system as the embodiment of the present invention.

In the power supply system, when the second vehicle 1B is an electric vehicle, the vehicle presence determination portion 26a may detect the presence of the second vehicle 1B based on communication connections for charging and discharging performed by the electric vehicle as the second vehicle 1B. As illustrated in FIG. 11, the electric vehicle as the second vehicle 1B includes the EV rechargeable battery 11, battery information storage portion 12, and communication portion 13 similarly to the electric vehicle 1A. The electric vehicle as the second vehicle 1B is connected to the house system 2 via a power cable at the process of charging and discharging the electric vehicle as the second vehicle 1B similarly to the electric vehicle 1A.

The house system 2 includes a charge/discharge converter 23B which is connected to an electric vehicle as the second vehicle 1B in addition to a charge/discharge converter 23A which is connected to the electric vehicle 1A. Moreover, the communication portion 13 of the electric vehicle 1A and the communication portion 13 of the electric vehicle as the second vehicle 1B are connected to the communication portion 25 so as to communicate with the same. The communication portion 25 is connected to the vehicle presence determination portion 26a of the vehicle detection portion 26. The vehicle presence determination portion 26a can therefore detect communication connections between the communication portion 25 and the electric vehicle 1A and electric vehicle as the second vehicle 1B.

Figure 12:
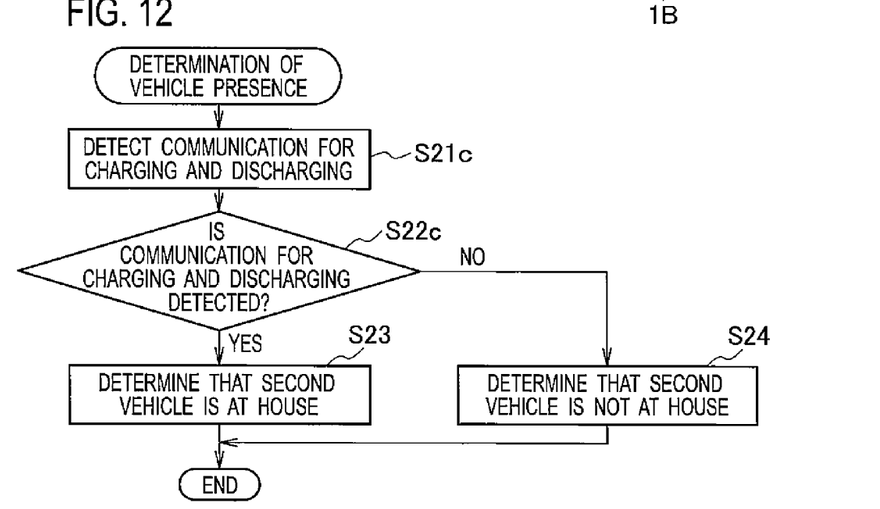
FIG. 12 is a flowchart showing still another process of determining the presence of a second vehicle in the power supply system illustrated as the embodiment of the present invention.

In this power supply system, the process of determining the presence of the second vehicle is performed as shown in FIG. 12. First in step S21c, the vehicle presence determination portion 26a detects communication for charging and discharging which is being performed by the communication portion 25. The communication for charging and discharging by the communication portion 25 includes every communication concerning charge and discharge of the EV rechargeable battery 11, for example, including: communication for establishing a communication connection when the electric vehicle 1 is connected via the power cable; and notification of the charge level transmitted from the electric vehicle 1 to the house system 2.

In step S22c, the vehicle presence determination portion 26a determines whether the communication for charging and discharging by the communication portion 25 is detected. When a communication signal is detected between the communication portion 25 and the electric vehicle as the second vehicle 1B, the process goes to the step S23, and the vehicle detection portion 26 determines that there is an electric vehicle as the second vehicle 1B other than the electric vehicle 1A. Otherwise, in the step S24, the vehicle detection portion 26 determines that there is no electric vehicle as the second vehicle 1B other than the electric vehicle 1A.

The power supply system therefore determines the presence of an electric vehicle as the second vehicle 1B other than the electric vehicle 1 by using the vehicle presence determination portion 26a and controls the power supplied from the EV rechargeable battery 11 to the house system 2 based on the determination result by using the controller 24.

In the aforementioned power supply system, desirably, the controller 24 calculates the cruising distance of the second vehicle 1B which is detected by the vehicle detection portion 26 and determines the power supplied from the electric vehicle 1A to the house system 2 in accordance with the calculated cruising distance. In other words, the controller 24 may set the lower limit of the charge level in accordance with the state of the second vehicle 1B. In this power supply system, similarly to FIG. 11 described above, the house system 2 can be connected to plural electric vehicles, including the electric vehicle 1A and an electric vehicle as the second vehicle 1B.

Figure 13:
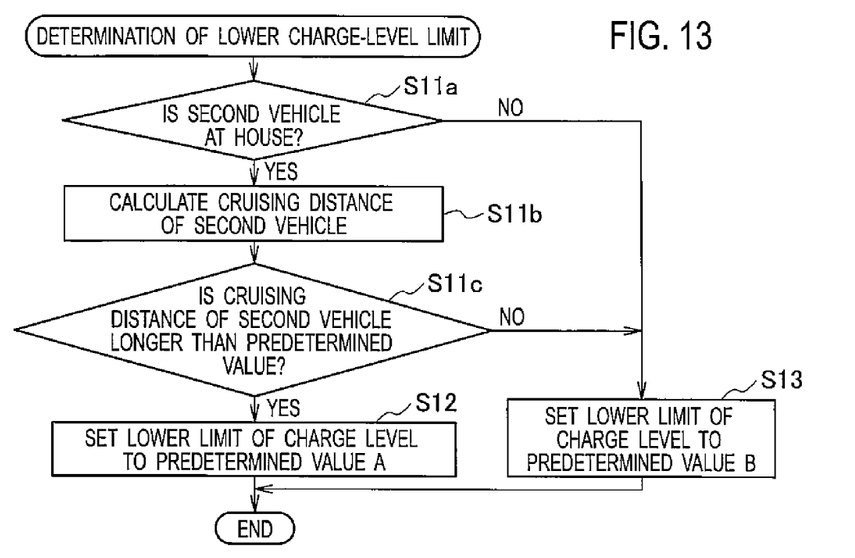
FIG. 13 is a flowchart showing another process of determining the lower limit of the charge level of the EV rechargeable battery in the power supply system as the embodiment of the present invention.

The power supply system performs the operation as shown in FIG. 13 in order to set the lower limit of the charge level.

First in step S11a, the controller 24 determines whether the second vehicle 1B other than the electric vehicle 1 is at the house based on the detection result from the vehicle detection portion 26. In this process, the vehicle presence determination portion 26a detects communication between the communication portion 25 and the electric and second vehicles 1A and 1B and performs the determination in the step S11a. In the presence of the second vehicle 1B other than the electric vehicle 1, the process goes to the step S11b and otherwise goes to the step S13.

In the step S11b, the controller 24 calculates the cruising distance of the second vehicle 1B. In this process, when the second vehicle 1B is an electric vehicle, the controller 24 detects the charge level of the electric vehicle and multiplies the charge level by electric mileage information of the electric vehicle to calculate the cruising distance of the electric vehicle as the second vehicle 1B.

Figure 14:
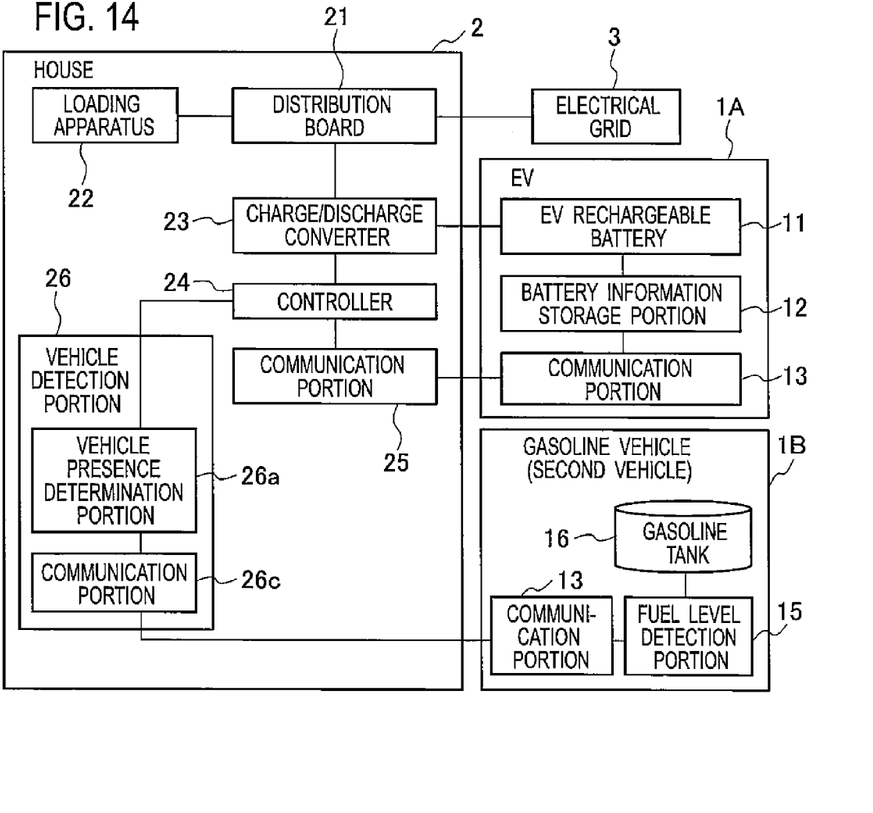
FIG. 14 is a block diagram showing still another configuration of the power supply system as the embodiment of the present invention.

When the second vehicle 1B is a gasoline vehicle as shown in FIG. 14, the controller 24 acquires the amount of gasoline remaining in a gasoline tank 16 through a fuel level detection portion 15. The controller 24 multiplies fuel mileage information of the gasoline vehicle by the amount of remaining gasoline to calculate the cruising distance of the gasoline vehicle as the second vehicle 1B. When the second vehicle 1B is a hybrid vehicle, the controller 24 detects the charge level and the amount of remaining gasoline and respectively multiplies the charge level and the amount of remaining gasoline by the electric mileage information and the fuel mileage information to calculate the cruising distance. The electric mileage information and fuel mileage information of the second vehicle 1B are previously set and stored so as to be used by the controller 24.

In next step S11c, the controller 24 determines whether the cruising distance of the second vehicle 1B calculated in the step S11*b* is less than a predetermined value. When the cruising distance of the second vehicle 1B calculated in the step S11*b* is not less than a predetermined value, the process goes to the step S12 and otherwise goes to step S13.

In the step S12, the controller 24 sets the lower limit of the charge level of the EV rechargeable battery 11 to the predetermined value A (a low level). In the step S13, the controller 24 sets the lower limit of the charge level of the EV rechargeable battery 11 to the predetermined value B (a high level) (see FIG. 2(*b*)).

As described above, this power supply system calculates the cruising distance of the second vehicle 1B and determines the power supplied from the electric vehicle 1 to the house system 2 based on the calculated cruising distance. By checking the cruising distance of the second vehicle 1B in such a manner, the travel means in emergencies is ensured more reliably.

Figure 15:
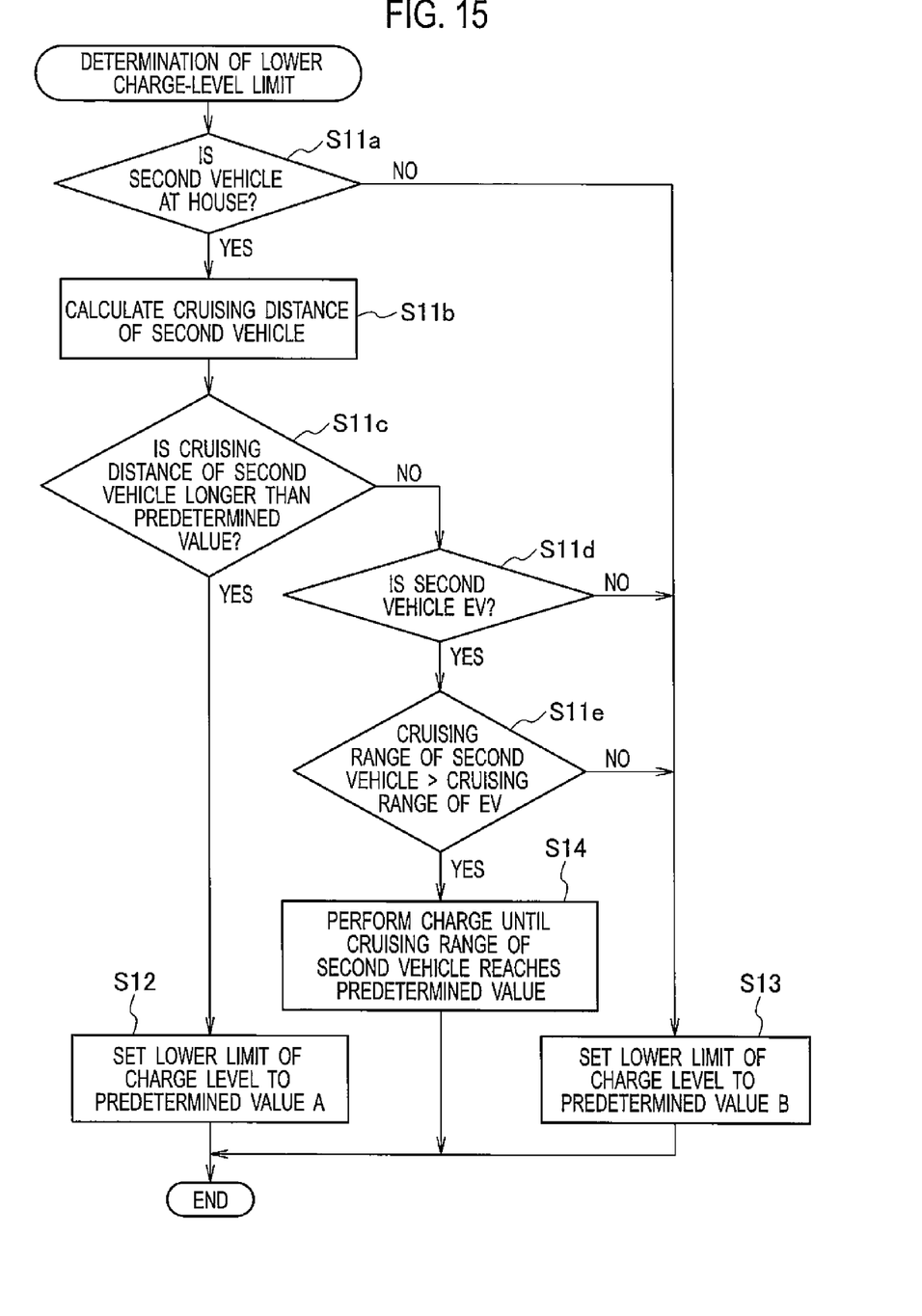
FIG. 15 is a flowchart showing another process of determining the lower limit of the charge level of the EV rechargeable battery in the power supply system as the embodiment of the present invention.

Moreover, in the power supply system including plural electric vehicles 1 and gasoline vehicles, discharge of the electric vehicle 1 can be controlled by the operation shown in FIG. 15. In FIG. 15, when determining in the step S11*c* that the cruising distance of the second vehicle 1B is less than the predetermined value, the controller 24 proceeds to step S11*d*.

In the step S11*d*, the controller 24 determines whether the second vehicle 1B is an electric vehicle. When the house system 2 is connected to plural electric vehicles, like the electric vehicle 1A and an electric vehicle as the second vehicle 1B as shown in FIG. 11, the controller 24 can acquire the charge level from the electric vehicle as the second vehicle 1B. The controller 24 thereby determines that the second vehicle 1B is an electric vehicle.

When the second vehicle 1B is an electric vehicle, it is determined in step S11*e* whether the cruising distance of the electric vehicle as the second vehicle 1B is longer than that of the electric vehicle 1A. When the cruising distance of the electric vehicle as the second vehicle 1B is longer, the electric vehicle as the second vehicle 1B is charged so that the cruising distance thereof reaches a predetermined value in the step S14. The result of the determination in the step S11*c* thereby becomes positive in the following steps, and the controller 24 sets the lower limit of the charge level to the predetermined value A (a low level) in the step S12. Accordingly, the electric vehicle 1A can be discharged in the step S5 until the charge level thereof reaches the predetermined value A (a lower level).

On the other hand, when the house system 2 is connected to a gasoline vehicle as the second vehicle 1B as shown in FIG. 14, or when it is determined in the step S11*e* that the cruising distance of the second vehicle 1B is not longer, the process goes to the step S13. In the step S13, the controller 24 sets the lower limit of the charge level of the EV rechargeable battery 11 to the predetermined value B (a high level) (see FIG. 2(*b*)).

In such a manner, in the power supply system, the controller 24 calculates the cruising distance of the second vehicle 1B detected by the vehicle detection portion 26 (step S11*b*) and determines the power supplied from the electric vehicle 1A to the house system 2 based on the calculated cruising distance.

When the cruising distance of the second vehicle is not shorter than the predetermined value, the controller 24 can set the charge level lower. On the other hand, when the cruising distance of the second vehicle 1B is shorter than the predetermined value, the controller 24 determines whether the second vehicle 1B is an electric or gasoline vehicle (or not). When the second vehicle 1B is not an electric vehicle, the controller 24 can keep high the charge level of the electric vehicle 1A to secure the travel means in emergencies.

On the other hand, when the second vehicle 1B is an electric vehicle, the controller 24 compares the cruising distance of the electric vehicle 1A with that of the second vehicle 1B. When the cruising distance of the electric vehicle as the second vehicle 1B is shorter, the controller 24 keeps high the charge level of the electric vehicle 1A as the travel means in emergencies.

When the cruising distance of the electric vehicle 1A is shorter, the controller 24 charges the electric vehicle as the second vehicle 1B as the travel means in emergencies so that the cruising distance thereof reaches a predetermined distance. When the electric vehicle 1A and second vehicle 1B are both electric vehicles as described above, the travel means in emergencies is selected from the electric and second vehicles 1A and 1B based on the cruising distances thereof and is charged when needed. It is therefore possible to supply power from the electric vehicle 1A to the house system 2 while immediately securing the travel means in emergencies.

The above-described embodiment is an example of the present invention. Accordingly, the present invention is not limited to the above-described embodiment. It is certain that the present invention can be variously changed in accordance with the design and the like, without departing from the technical idea according to the present invention in addition to the aforementioned embodiment.

The entire contents of Japanese Patent Application No. 2011-244632 (filed on: 8 Nov. 2011) are incorporated herein by reference.

INDUSTRIAL APPLICABILITY

According to the present invention, the electric power supplied from the electric vehicle to the house is determined in accordance with the presence of another vehicle detected by the vehicle detection portion. It is therefore possible to supply electric power from the electric vehicle to the house with the travel means in emergencies secured.

REFERENCE SIGNS LIST

1 . . . ELECTRIC VEHICLE
22 . . . LOADING DEVICE (ELECTRIC DEVICE)
24 . . . CONTROLLER
26 . . . VEHICLE DETECTION PORTION
26*a* . . . VEHICLE PRESENCE DETERMINATION PORTION
26*b* . . . SENSOR DEVICE
26*c* . . . COMMUNICATION PORTION
26*d* . . . OPERATION PORTION

The invention claimed is:

1. A power management device, which manages power exchanged between an electric vehicle and a house including an electric device, the device comprising:
   a vehicle detection portion configured to detect presence of a second vehicle which is available for a resident of the house; and
   a power controller configured to determine power supplied from the electric vehicle to the house in accordance with the presence of the second vehicle detected by the vehicle detection portion, wherein
   the power controller changes a lower limit of a charge level of the electric vehicle to a predetermined value A in accordance with the presence of the second vehicle detected by the vehicle detection portion and discharges power from the electric vehicle to the house until the charge level reaches the predetermined value A, and in a case where the presence of the second vehicle is not detected by the vehicle detection portion, the power controller sets the lower limit of the charge level to a predetermined value B higher than the predetermined value A and discharges power from the electric vehicle to the house until the charge level reaches the predetermined value B.

2. The power management device according to claim 1, wherein the vehicle detection portion detects the presence of the second vehicle with a sensor device.

3. The power management device according to claim 1, wherein the vehicle detection portion detects the presence of the second vehicle by communication with the second vehicle.

4. The power management device according to claim 1, wherein the vehicle detection portion detects the presence of the second vehicle through an operation portion operated by a user.

5. The power management device according to claim 1, wherein when the second vehicle is an electric vehicle, the vehicle detection portion detects the presence of the second vehicle based on communication connection for charging and discharging which is performed by the electric vehicle.

6. The power management device according to claim 1, wherein the power controller calculates a cruising distance of the second vehicle detected by the vehicle detection portion and determines power to be supplied from the electric vehicle to the house based on the calculated cruising distance.

* * * * *